Nov. 18, 1958 W. BORNEMANN ET AL 2,860,906

DEVICE FOR HANDLING A PLURALITY OF INFORMATION BEARING MEDIUMS

Filed June 23, 1955 3 Sheets-Sheet 1

WILLIAM BORNEMANN
CARTER J. HUGHEY
INVENTORS

BY Daniel I. Mayne
Lloyd F. Seebach
ATTORNEY & AGENT

WILLIAM BORNEMANN
CARTER J. HUGHEY
INVENTORS

BY Daniel I. Mayne
Lloyd F. Seebach
ATTORNEY & AGENT

Nov. 18, 1958 W. BORNEMANN ET AL 2,860,906

DEVICE FOR HANDLING A PLURALITY OF INFORMATION BEARING MEDIUMS

Filed June 23, 1955 3 Sheets-Sheet 3

WILLIAM BORNEMANN
CARTER J. HUGHEY
INVENTORS

BY Daniel I. Mayne

Lloyd F. Seebach

ATTORNEY & AGENT

United States Patent Office 2,860,906

Patented Nov. 18, 1958

2,860,906

DEVICE FOR HANDLING A PLURALITY OF INFORMATION BEARING MEDIUMS

William Bornemann and Carter J. Hughey, Rochester, N. Y., assignors to Eastman Kodak Company, Rochester, N. Y., a corporation of New Jersey Application June 23, 1955, Serial No. 517,611

8 Claims. (Cl. 294—1)

The invention relates to a device for handling a plurality of information bearing mediums as a unit for purposes of transporting said mediums and for inserting and removing said mediums from magazines and/or files in which said mediums are to be positioned or retained without benefit of said device.

The information bearing mediums can be statistical cards of the punched or printed type, ledger cards, documents, etc. In the illustrated embodiment of the invention, however, such mediums are pieces of film of the type provided by the camera disclosed in U. S. application Serial No. 508,139, filed May 13, 1955, and utilized in such apparatus as the sorter disclosed in U. S. Patent No. 2,795,328. These mediums are relatively small in size and are provided with rectangular apertures adjacent one edge thereof. Because of their size, the problem of handling large numbers of these mediums for purposes of filing, sorting, transporting, etc., presents a problem which has heretofore not been presented due to the larger size of statistical cards which are well-known in the art.

It has been found that these small information bearing mediums can best be handled by a device which will permit any number of such mediums to be handled or transported as a unit. In this way, particularly in instances where the mediums are a light-sensitive material or film, handling of the mediums by the file clerk or operator is not necessary and the problem of finger prints, smudges, etc., appearing on the mediums is entirely eliminated. Since all of the sorting, filing, collating, duplicating and other operations are performed by suitable machines, the operator is required to only insert and remove the mediums from the various apparatus. By means of the device to be described hereinafter, this operation of handling and transporting the mediums can be accomplished without touching the mediums. Further, because of the shape of the aperture in the mediums and the congruent shape of the element of the device inserted into the aperture, the mediums are prevented from turning or twisting on the element, thereby permitting the mediums to be easily inserted into and removed from the magazines of the various apparatus.

It is the primary object of the invention, therefore, to provide a device for handling a plurality of information bearing mediums as a unit and on which such mediums are retained in a fixed and contiguous relation to the device and to each other.

Another object of the invention is to provide a device for handling a plurality of information bearing mediums in which the mediums are retained in contiguous relation on an elongated member between a member fixed to one end of the elongated member and a member slidable along the elongated member.

Still another object of the invention is to provide a device for handling a plurality of information bearing mediums in which the mediums are retained in contiguous relation on an elongated member having a handle means at one end thereof and between a releasable member on the other end and a member movable along said elongated member.

And yet another object of the invention is to provide a device which is simple in construction and readily adapted to inserting into and removing from a magazine a plurality of information bearing mediums as a unit.

Other objects and advantages of the invention will be apparent to those skilled in the art from the detailed description which follows.

The information bearing mediums are provided with a rectangular aperture adjacent one edge thereof. This aperture is utilized to retain the mediums on an elongated member having a cross section congruous to the aperture and also prevents twisting or turning of the mediums on and about the elongated member. The elongated member has fixed to one end thereof a handle means to permit transporting the device and the mediums thereon. In one embodiment, the mediums are retained against the handle means by a retaining member which is movable along the elongated member for retaining the mediums in contiguous relation. For the purpose of inserting and removing the mediums into and from a magazine, however, the mediums are maintained in contiguous relation between a releasable member on the other end of the elongated member and a member which is slidable along the elongated member. The elongated member is of sufficient length to receive approximately 2000 mediums together with the retaining members therefor. This will be evident from the detailed description which follows.

Reference is now made to the accompanying drawings wherein like reference numerals designate like parts and wherein.

Figures 1, 5:
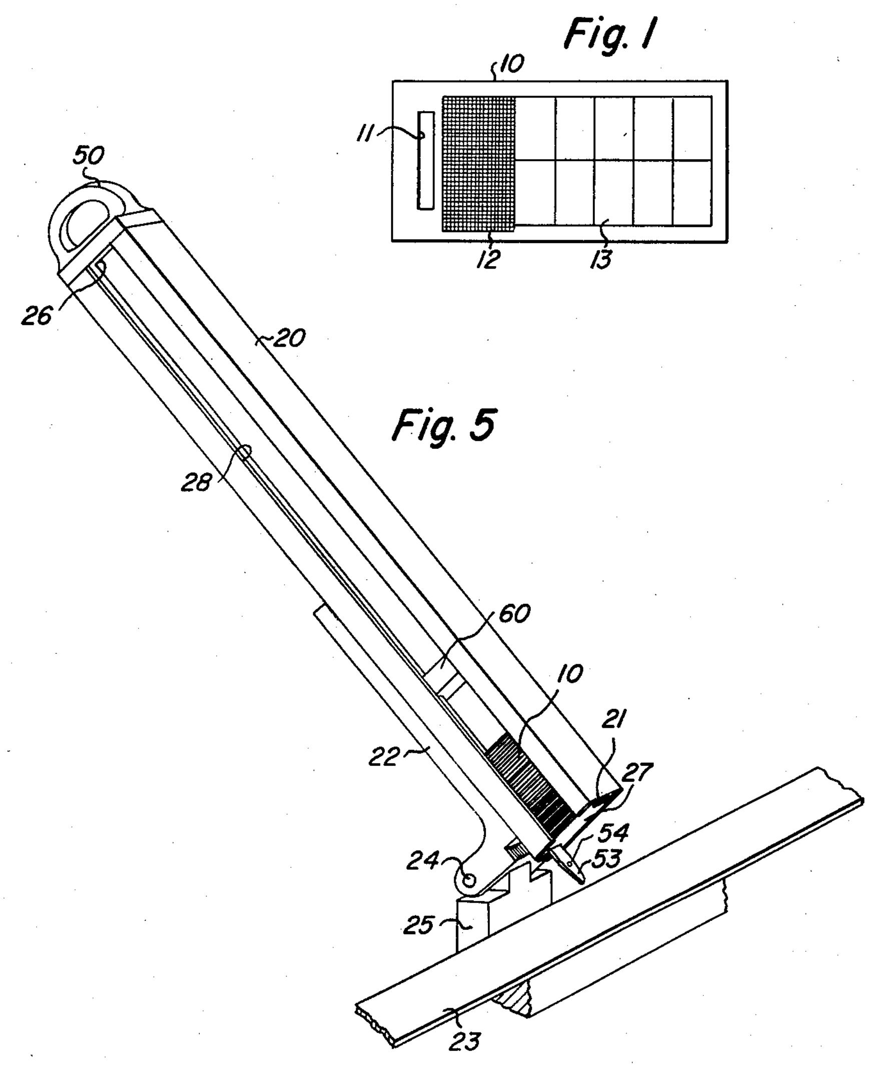
Fig. 1 is a plan view of a medium and showing the arrangement of the information thereon and the aperture by which the mediums are received by the device.
Fig. 5 is a perspective view of a magazine in the position for having the mediums inserted thereinto or removed therefrom.

The medium 10 disclosed in Fig. 1 is obtained by severing, after processing, the film strip exposed in the camera described in the above-mentioned application. Medium 10 is approximately five-eighths of an inch wide and one and one-quarter inches long. A rectangular aperture 11 is provided at one end thereof for a purpose to described hereinafter. Adjacent aperture 11, an area 12 of code has been exposed and adjacent the code area is the document image area 13. As described in the above applications, each medium is capable of having fourteen document images exposed thereon, seventy lines of code, or a combination of lines of code and document images, as shown in Fig. 1. The code is utilized for purposes of information, classification, etc., and relates to the document images on the same medium.

Figures 2, 3, 4:
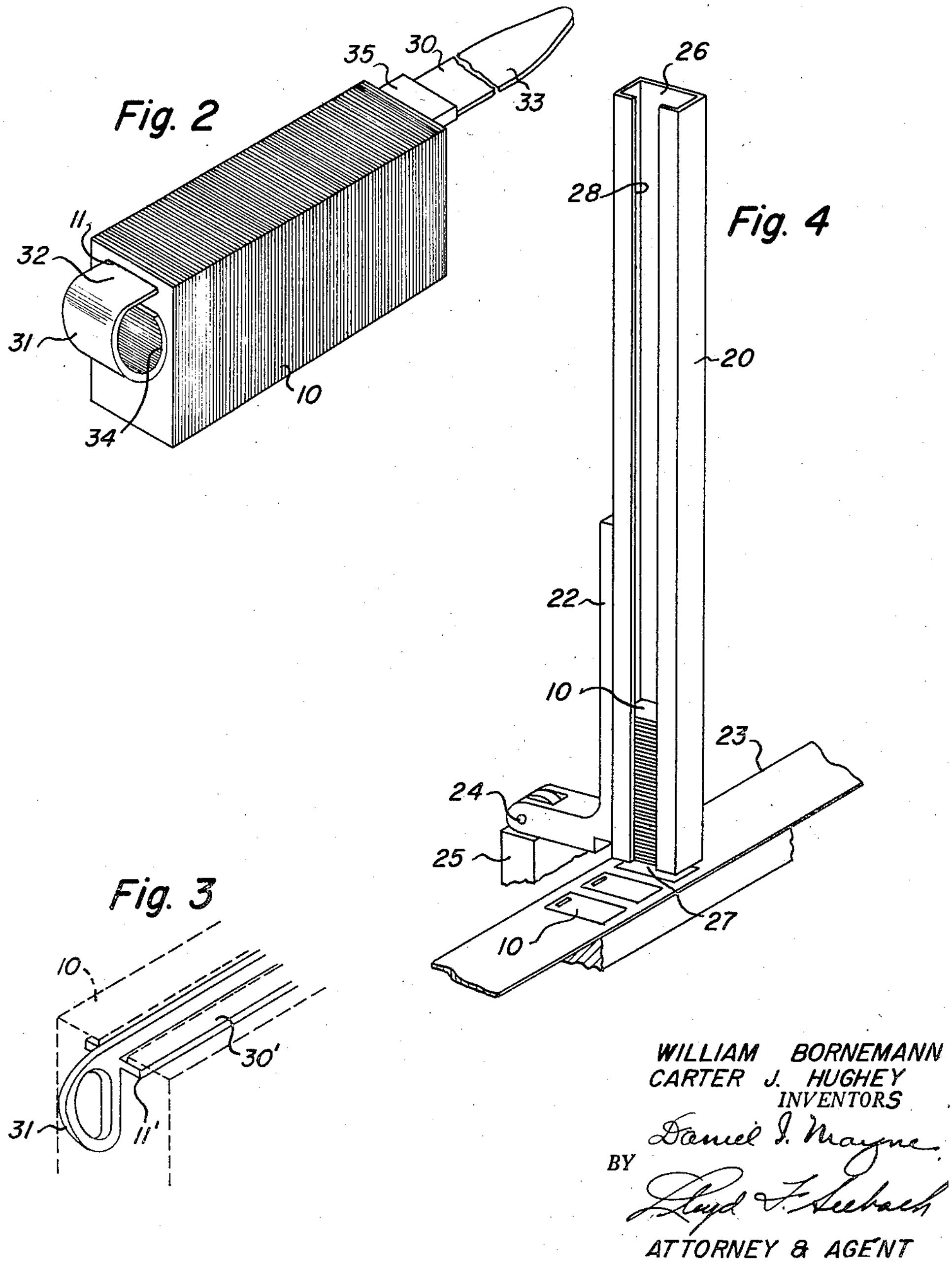
Fig. 2 is a perspective view of one embodiment of the invention and showing the manner in which the mediums are retained on the device.
Fig. 3 is a perspective view of another embodiment of the device in which the medium is provided with an open end T-shaped aperture.
Fig. 4 is a perspective view of a magazine and showing the normal position of the magazine with respect to a conveyor for receiving the medium therefrom or having the mediums fed onto the conveyor.

Inasmuch as the invention is utilized in the same manner in the various apparatus utilized for filing, sorting, etc., the mediums, it is deemed to be sufficient to briefly describe only how the mediums are stacked in a sorter to illustrate the use of the invention, it being understood that it will be similarly employed in other apparatus. The mediums 10, as shown in Fig. 4, are arranged within the hollow and open-end magazine 20 in a vertical stack with the apertures 11 aligned to provide a continuous aperture throughout the height of the stack. Magazine 20 is provided at the lower end thereof with lips 21 which engage the marginal edges of the lowermost medium, thereby supporting the stack of said mediums within the magazine. Magazine 20 is secured to bracket 22 and positioned with relation to conveyor means or belt 23, whereby said mediums are transported from one magazine to another. By suitable means associated and synchronized with the movement of belt 23, mediums 10 are removed from the belt and inserted into the magazine or removed from the magazine for placement on the belt for movement to another magazine. With either operation it becomes necessary to insert additional mediums in the magazine when the supply is depleted or to remove the mediums when the magazine is full. It can be readily appreciated that the insertion into or removal from the magazine of approximately two thousand small pieces of film would present a problem, particularly when the mediums must be retained in order. For this purpose bracket 22, on which magazine 20 is mounted, is pivotally mounted at 24 to a suitable support 25 which permits the magazine to be tilted or moved to a loading or unloading position, as shown in Fig. 5.

To facilitate the handling of mediums 10 as a unit and to permit mediums 10 to be easily inserted or removed from magazine 20, an elongated member 30 having a cross section congruous to aperture 11 in mediums 10 is provided. Member 30 may be formed, as shown in Fig. 2, with a handling means 31 at one end 32. The other end 33 can be tapered in both dimensions to facilitate entry thereof into aperture 11. A portion 34 of handling means 31 serves as a stop or retainer for mediums 10 as they are positioned on member 30. In order to maintain mediums 10 in contiguous relation on member 30, a clip or collar 35 frictionally engages member 30 and is movable therealong to effectively clamp or retain said mediums between portion 34 and the face of clip 35 engaging the last medium positioned on member 30. By providing an aperture in medium 10 which is non-circular and making the cross section of member 30 congruous thereto, it is evident that mediums 10 cannot twist or turn on member 30 but are retained in alignment at all times.

Figures 6, 7, 8, 9, 10:
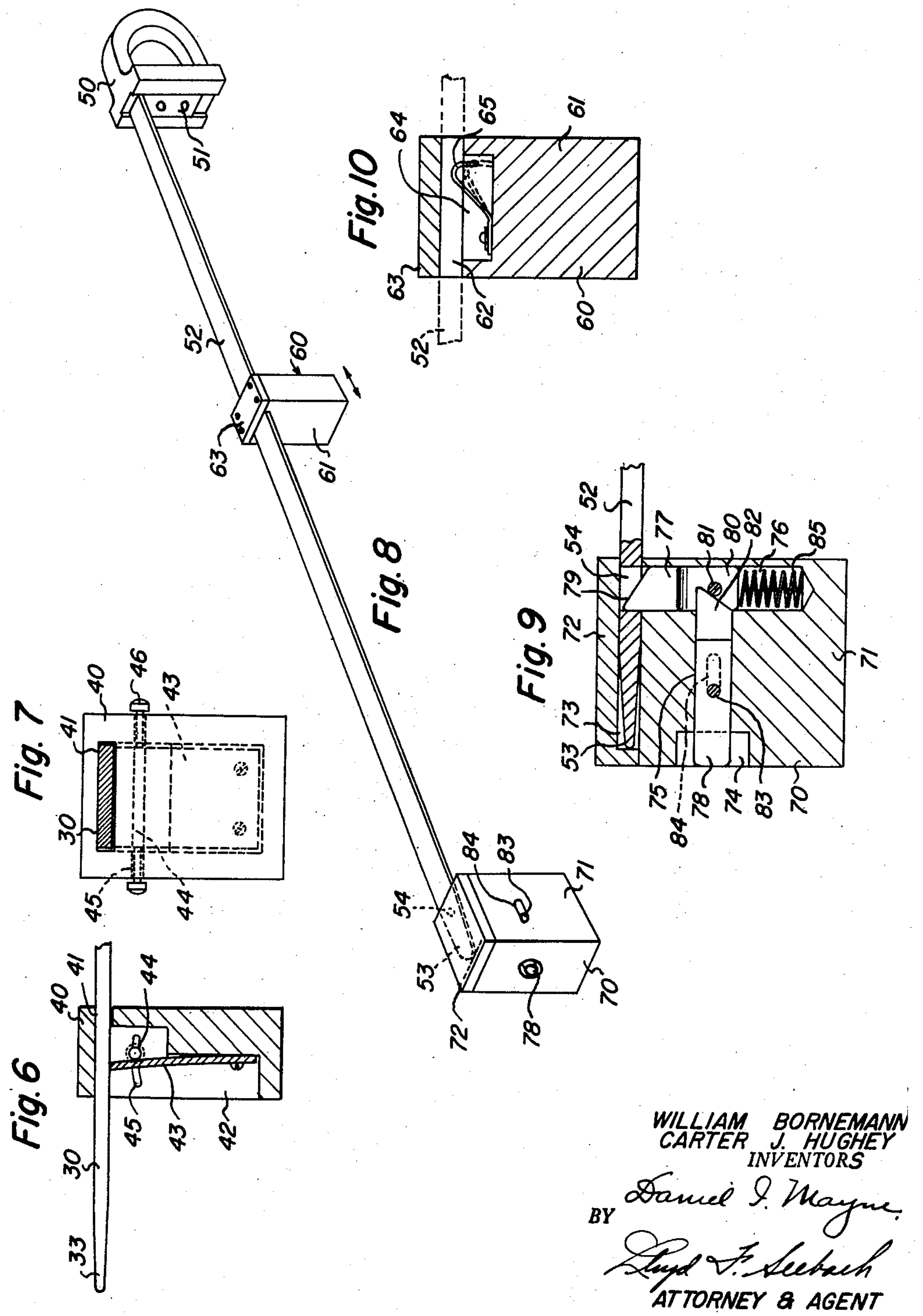
Figs. 6 and 7 are detail views of a releasable member which is freely movable along the elongated member in only one direction.
Fig. 8 is a perspective view of the device in which the mediums are retained in contiguous relation between the releasable member on the end of the elongated member and the member movable therealong.
Fig. 9 is a vertical section through the releasable retaining member on the end of the elongated member, as shown in Fig. 8.
Fig. 10 is a vertical section through the movable member shown in Fig. 8.

In order to provide a more positive holding action to insure that mediums 10 do not come off member 30, a retainer of the type shown in Figs. 6 and 7 can be utilized. Retaining means 40 is provided with an aperture 41 for receiving member 30 and a recess 42 in which is mounted a resilient member 43 for engaging one surface of member 30. When retaining means 40 is positioned on member 30, it can be moved freely toward handle means 31, the resilient member 43 then being urged in a direction in which it offers no opposition to movement. However, if retaining means 40 is moved in the opposite direction, resilient member 43 then tends to straighten and since it is longer than the vertical dimension to the underside of member 30, the end thereof engages member 30 to prevent movement of retaining means 40 in that direction. In order to release member 43, pin 44 is mounted behind member 43 and extends through slots 45 in the side walls of member 40. Buttons 46 are secured to each end of pin 44 for moving the pin against member 43 to release it from member 30, thereby permitting it to be withdrawn. Both clip 35 and retainer 40 provide, therefore, a means for retaining mediums 10 on member 30 and for maintaining the mediums in contiguous relation while thereon.

Fig. 3 discloses another embodiment of aperture for medium 10. In this embodiment, aperture 11' is also rectangular and open to the edge to provide a C-shaped aperture. To conform to this aperture, elongated member 30' is T-shaped in cross section and clip 35 can be either of the same cross section or C-shaped.

In order to insert mediums 10 in magazine 20, clip 35, or retainer 40, is first moved to the end of member 30 with the mediums positioned thereagainst. The end 33 of member 30 is then inserted in the upper open end 26 of magazine 20. The entire unit is then lowered into the magazine by handle means 31 until clip 35 or retainer 40 is positioned beyond the lower end 27 of magazine 20. The retaining means is then withdrawn from member 30 and member 30, in turn, is withdrawn from open end 26. Mediums 10 are then stacked in magazine 20 with apertures 11 in alignment and are supported therein by lips 21. In a similar manner, when it is desired to remove mediums 10 from the magazine, member 30 is inserted into the open end 26 and into apertures 11. Member 30 is then urged downward until end 33 extends beyond open end 27. Clip 35 or retaining means 40 is then placed on the end 33 and the entire assembly is then withdrawn by handle means 31 through open end 26. It is evident that member 30 must be greater in length than the height of magazine 20 in order to permit end 33 to extend beyond open end 27 and since retainer 40 is moved through magazine 20 when mediums 10 are inserted or removed, the overall dimensions of retainer 40 in the plane of medium 10 must be smaller than the dimensions as defined by lips 21 in order to permit movement thereby.

In Figs. 8, 9 and 10 another embodiment of the invention is disclosed in which handle means 50 is fixed to end 51 of the elongated member 52. The other end 53 is also tapered in two dimensions and is provided with an aperture 54. Retaining means 60 comprises a block 61 having a slot 62 which with cover 63 provides an aperture for member 52. Block 61 is also provided with a recess 64 in which the formed spring 65 is mounted. In assembled relation with member 52, spring 65 frictionally engages the underside of member 52 but permits movement thereof in either direction. Releasable means 70 engages the end 53 of member 52 and comprises block 71 and cover 72 which is provided with a blind recess 73. Block 71 is provided with a counterbore 74 and an aperture 75 which connects the counterbore with the blind hole 76. Latching pin 77 is arranged within hole 76 and release button 78 is arranged within aperture 75. Pin 77 is provided with a nose 79 for engaging aperture 54 in member 52, a slot 80 in the rear end thereof and a pin 81 extending through said slot. Button 78 is provided with a flat nose 82 which enters slot 80 in latching pin 77 and engages pin 81 carried thereby. Pin 83, which is carried by button 78, extends into the elongated apertures 84 in block 71 and serves as a guide for release button 78 as well as preventing rotation thereof. Spring 85, which is seated in hole 76 behind latching pin 77, urges both latching pin 77 and release button 78 in an outward direction due to the engagement of nose 82 with pin 81 but is limited in its movement by pin 83 in slots 84.

In an assembled relation, recess 73 in cover 72 becomes an enclosed and blind recess into which member 52 can be inserted. The tapered end 53 of member 52, when inserted into releasable means 70, strikes nose 79, thereby moving latching pin 77 downward against the action of spring 85 and holding it in this position until aperture 54 is aligned with pin 77. Spring 85 then urges nose 79 into aperture 54 to retain releasable means 70 on member 52. In order to release the two elements, release button 78 is pressed inwardly so that nose 82 cams latching pin 77 downwardly by means of pin 81 and against the action of spring 85, thereby removing latching pin 77 from aperture 54 and permitting the two elements to be separated.

Since retaining means 60 remains with member 52, mediums 10 are retained in contiguous relation between and against releasable means 70 by retaining means 60. With this arrangement the mediums are always positioned on member 52 adjacent end 53 which eliminates the necessity for moving mediums 10 along member 52 to position them in magazine 20 or to move them along member 52 toward the handle means after removal from the magazine.

As in the previously described embodiment, the entire unit, that is, the releasable means 70, mediums 10 and retaining means 60 on member 52, is inserted into the open end 26 of magazine 20 when in the loading position as shown in Fig. 5, and moved downwardly by handle means 50 until releasable means 70 is below and without open end 27. The releasable means is then withdrawn from end 53 of member 52, and member 52 and retaining means 60 are then withdrawn through open end 26, the mediums 10 being retained in magazine 20 and supported by lips 21. When member 52 and retaining means 60 are inserted in open end 26 for removing mediums 10, retaining means 60 also serves as a guide for member 52 as it is moved toward mediums 10. If retaining means 60 is not in close proximity to the uppermost medium when member 52 is fully inserted into magazine 20, it can be moved toward the mediums merely by inserting a finger in slot 28 and moving it downwardly. In the event retaining means 60 is too close to end 53, the stack of mediums will serve to move it along member 52 until end 53 extends beyond open end 27. Releasable means 70 is then snapped on end 53 and the entire unit is withdrawn through open end 26. As mentioned hereinbefore, the overall dimensions of releasable means 70 in the plane of mediums 10 must be less than the dimensions in the same plane within lips 21 in order to permit movement of releasable means 70 through open end 27. After insertion or removal of mediums 10, magazine 20 is returned to its normal position with respect to conveyor 23 and suitable means can be provided to lock the magazine in this position.

It is evident from the foregoing description that a satisfactory and efficient means for handling and/or transporting mediums 10 has been devised and which eliminates any handling of the individual mediums by the operator. While aperture 11 in mediums 10 has been disclosed and described as being rectangular, apertures of other shape are capable of producing the same result without departing from the spirit of the invention. Since many other modifications of the invention will be apparent to those skilled in the art, the invention is not to be limited to the illustrated embodiments disclosed but is defined by the appended claims.

Having now particularly described our invention, what we desire to secure by Letters Patent of the United States and what we claim is:

1. A device for handling as a unit a variable number of information bearing mediums, each medium having a non-circular aperture adjacent one edge thereof, comprising an elongated member having a cross section congruous to said aperture and adapted to be inserted into said aperture for positioning said mediums thereon, handle means fixed to one end of said member and having a surface extending perpendicular to said elongated member for engaging the first of said mediums positioned thereon, retaining means adapted to be received by the other end of said elongated member and freely movable therealong only in a direction toward said handle means for maintaining said mediums in contiguous relation between said surface and said retaining means, holding means carried by said retaining means and engaging said elongated member for permitting movement of said retaining means in only the one direction, and means on said retaining means for engaging and moving said holding means to an inoperative position to permit movement of said retaining means in either direction along said elongated member.

2. A device for handling a variable number of information bearing mediums, each medium having a non-circular aperture adjacent one edge thereof, comprising an elongated member having a cross section congruous to said aperture and provided at one end thereof with an aperture, said member being adapted to be inserted in the aperture of said mediums for positioning said mediums thereon, means adapted to be received by the one end of said elongated member for retaining said elements thereon, means carried by the retaining means for releasably engaging the aperture in said elongated member to lock the retaining means in position, and means fixed to the other end of said elongated member for retaining said mediums thereon and including means for handling said device and the mediums on said elongated member as a unit.

3. A device for handling a variable number of information bearing mediums, each medium having a non-circular aperture adjacent one edge thereof, comprising an elongated member having a cross section congruous to said aperture and provided at one end thereof with an aperture, said member being adapted to be inserted in the aperture of said mediums for positioning said mediums thereon, retaining means for receiving the one end of said elongated member and including a releasable latch member for engaging the aperture in the one end of said elongated member, means slidably mounted on said elongated member and including resilient means in engagement therewith for frictionally maintaining said slidable means in any position therealong to retain said mediums in contiguous relation between said retaining means and said slidable means, and means fixed to the other end of said elongated member for handling said device and the mediums thereon as a unit.

4. A device for handling a variable number of information bearing mediums, each medium having a non-circular aperture adjacent one edge thereof, comprising an elongated member having a cross section congruous to said aperture and provided at one end thereof with an aperture, said member being adapted to be inserted in the aperture of said mediums for positioning said mediums thereon, a member having a recess for receiving one end of said elongated member and for retaining said mediums on said elongated member, a releasable latch member carried by said retaining member for engaging the aperture in said elongated member when said retaining member is positioned thereon, a holding member having an aperture for receiving said elongated member and movable therealong to abut and maintain said mediums in contiguous relation against said retaining member, means carried by said holding member for frictionally engaging said elongated member to maintain said holding member in any position therealong, and means fixed to the other end of said elongated member for handling said device and the mediums thereon as a unit.

5. A device for removing from a magazine a plurality of information bearing mediums, said magazine having open ends with means at one end thereof for engaging the marginal edges of the lowermost medium to support said mediums in a stack and each of said mediums being provided with a non-circular aperture adjacent one edge thereof and adapted to be arranged within said magazine with said apertures in alignment, an elongated member having a cross section congruous to the aperture in said mediums and for insertion into the other open end of said magazine and into the apertures of said mediums and extending beyond said one open end when fully inserted into the magazine, releasable means for engaging the extending end of said elongated member and for retaining said mediums thereon, and means fixed to the other end of said elongated member for retaining said mediums and including means for handling said device and the mediums thereon as a unit, said releasable means being movable through the open ends of said magazine when said elongated member with said mediums thereon is withdrawn from said magazine.

6. A device for inserting into and removing from a magazine a plurality of information bearing mediums, said magazine having open ends with means at one end thereof for engaging the marginal edges of the lowermost medium to support said mediums in a vertical stack and each medium being provided with a non-circular aperture adjacent one edge thereof and adapted to be arranged within said magazine with said apertures in alignment, an elongated member having a cross section congruous to the aperture in said mediums and of a length greater than the height of said magazine when fully inserted therein, releasable means for engaging one end of said elongated member for retaining said mediums thereon, and means fixed to the other end of said elongated member for retaining said mediums and including means for handling said device and the mediums thereon as a unit, said releasable means being movable through the open ends of said magazine when said elongated member with said mediums thereon is inserted into the magazine to position said mediums therein and when said elongated member is withdrawn from the magazine with said mediums retained thereon for removal from the magazine.

7. A device for inserting into and removing from a magazine a plurality of information bearing mediums, said magazine having open ends with means at one end thereof for engaging the marginal edges of the lowermost medium to support said mediums in a vertical stack and each medium being provided with a non-circular aperture adjacent one edge thereof and adapted to be arranged within said magazine with said apertures in alignment, an elongated member having a cross section congruous to the aperture in said mediums and of a length greater than the height of said magazine when fully inserted therein, means fixed to one end of said elongated member for retaining said mediums thereon and including handle means for inserting and removing said elongated member with respect to said magazine, retaining means for engaging the other and extending end of said elongated member and movable to any position therealong in only one direction when without said magazine for maintaining said mediums in contiguous relation against said fixed means, means carried by said retaining means and engaging said elongated member for permitting movement of said retaining means in only the one direction, and means on said retaining means for disengaging said last-mentioned means to permit movement of said retaining means in a direction for removal from said elongated member, said retaining means being movable through the open ends of said magazine when said elongated member with said mediums is inserted into the magazine to position said mediums therein and when said elongated member is withdrawn from the magazine with said medium retained thereon by said retaining means for removal from the magazine.

8. A device for inserting into and removing from a magazine a plurality of information bearing mediums, said magazine having open ends with means at one end thereof for engaging the marginal edges of the lowermost medium to support said mediums in a vertical stack and each medium being provided with a non-circular aperture adjacent one edge thereof and adapted to be arranged within said magazine with said apertures in alignment, an elongated member having a cross section congruous to the aperture in said mediums and of a length greater than the height of said magazine, releasable means for engaging the one end of said elongated member for retaining said mediums thereon when said mediums are to be removed from the magazine and removable from the one end when said mediums are to be positioned in the magazine, means on said elongated member and movable therealong for maintaining said mediums in contiguous relation and against said releasable means, and means fixed to the other end of said elongated member for handling said device and the mediums thereon as a unit, said releasable means and said movable means being movable through the open ends of said magazine when said elongated member with said mediums is inserted into the magazine to position said mediums within the magazine and when said elongated member is withdrawn from the magazine with said mediums thereon for removal therefrom.

References Cited in the file of this patent

UNITED STATES PATENTS

| | | |
|---|---|---|
| 948,161 | Cobb et al. | Feb. 1, 1910 |
| 949,626 | Drake | Feb. 15, 1910 |
| 995,847 | Drake | June 20, 1911 |
| 1,423,630 | Simmons | July 25, 1922 |
| 1,818,592 | Walworth | Aug. 11, 1931 |
| 2,119,561 | Smith | June 7, 1938 |
| 2,555,666 | Young | June 5, 1951 |